(12) United States Patent
Schaubhut et al.

(10) Patent No.: US 12,508,047 B2
(45) Date of Patent: Dec. 30, 2025

(54) DEVICES, SYSTEMS, AND METHODS FOR ACCESSING A BODY LUMEN

(71) Applicant: Boston Scientific Scimed, Inc., Maple Grove, MN (US)

(72) Inventors: Andrew J. Schaubhut, Bolton, MA (US); Laura E. Christakis, Framingham, MA (US); Ryan V. Wales, Northborough, MA (US); Paul Smith, Smithfield, RI (US); Gene T. Storbeck, Millis, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 739 days.

(21) Appl. No.: 17/232,306

(22) Filed: Apr. 16, 2021

(65) Prior Publication Data
US 2021/0321995 A1 Oct. 21, 2021

Related U.S. Application Data

(60) Provisional application No. 63/011,386, filed on Apr. 17, 2020.

(51) Int. Cl.
*A61B 17/00* (2006.01)
*A61B 17/32* (2006.01)
*A61B 17/3207* (2006.01)
*A61M 25/00* (2006.01)
A61B 17/34 (2006.01)

(52) U.S. Cl.
CPC ... *A61B 17/320016* (2013.01); *A61M 25/005* (2013.01); *A61B 2017/00323* (2013.01); *A61B 2017/00818* (2013.01); *A61B 2017/320052* (2013.01); *A61B 2017/345* (2013.01); *A61M 25/0026* (2013.01)

(58) Field of Classification Search
CPC ............ A61M 25/0026; A61M 25/005; A61M 25/0144; A61M 25/0147; A61M 25/0136; A61F 2/97; A61F 2/01; A61B 17/320016; A61B 2017/00323
USPC ................................ 604/524, 525, 526, 527
See application file for complete search history.

(56) References Cited

U.S. PATENT DOCUMENTS

| 4,586,923 | A | * | 5/1986 | Gould | ............... | A61M 25/0147 |
| | | | | | | 604/95.04 |
| 5,405,378 | A | * | 4/1995 | Strecker | .................... | A61F 2/90 |
| | | | | | | 623/1.42 |
| 5,533,987 | A | | 7/1996 | Pray et al. | | |
| 6,017,340 | A | * | 1/2000 | Cassidy | ................. | A61B 18/14 |
| | | | | | | 606/47 |
| 6,945,956 | B2 | * | 9/2005 | Waldhauser | ...... | A61M 25/0012 |
| | | | | | | 604/95.01 |

(Continued)

FOREIGN PATENT DOCUMENTS

WO 2017044131 A1 3/2017

*Primary Examiner* — Tuan V Nguyen
(74) *Attorney, Agent, or Firm* — Seager, Tufte & Wickhem, LLP

(57) ABSTRACT

The disclosure relates generally to the field of medical devices for accessing body lumens. In an embodiment, a catheter may include a shaft having a proximal end, a distal end, and a length along a longitudinal axis extending through the shaft. A plurality of lumens may extend along the length of the shaft. At least one reinforcing filament may extend along the length of the shaft and between at least two of the plurality of lumens.

6 Claims, 6 Drawing Sheets

(56) References Cited

U.S. PATENT DOCUMENTS

| | | |
|---|---|---|
| 7,037,290 B2 | 5/2006 | Gardeski et al. |
| 8,236,040 B2 * | 8/2012 | Mayberry ............... A61F 2/954 623/1.11 |
| 9,114,229 B2 | 8/2015 | Fuentes |
| 9,314,587 B2 * | 4/2016 | Arnim ............... A61M 25/0053 |
| 9,427,551 B2 * | 8/2016 | Leeflang ........... A61M 25/0045 |
| 10,966,850 B2 * | 4/2021 | Irwin ........................ A61F 2/95 |
| 2002/0133141 A1 | 9/2002 | Sparks et al. |
| 2006/0270976 A1 | 11/2006 | Savage et al. |
| 2007/0250039 A1 * | 10/2007 | Lobbins ............ A61M 25/0053 604/523 |
| 2014/0142621 A1 * | 5/2014 | Masters ............. A61B 17/0057 606/213 |
| 2015/0174363 A1 * | 6/2015 | Sutermeister ....... A61M 25/005 604/95.04 |
| 2015/0209024 A1 * | 7/2015 | Piskun ............. A61B 17/00234 600/104 |
| 2019/0029854 A1 * | 1/2019 | Calomeni ............. A61F 2/2436 |
| 2019/0269884 A1 | 9/2019 | Sagi |

* cited by examiner

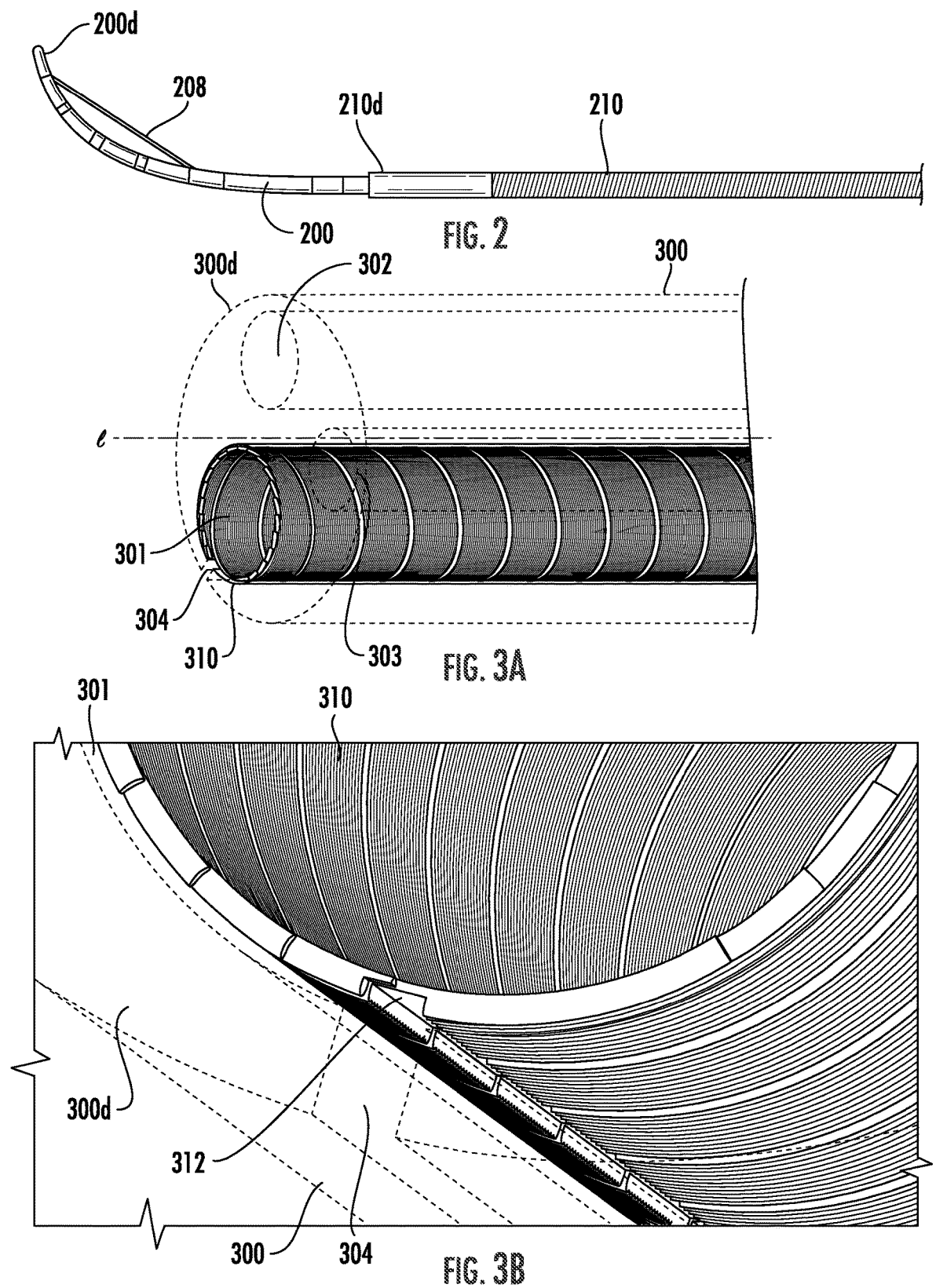

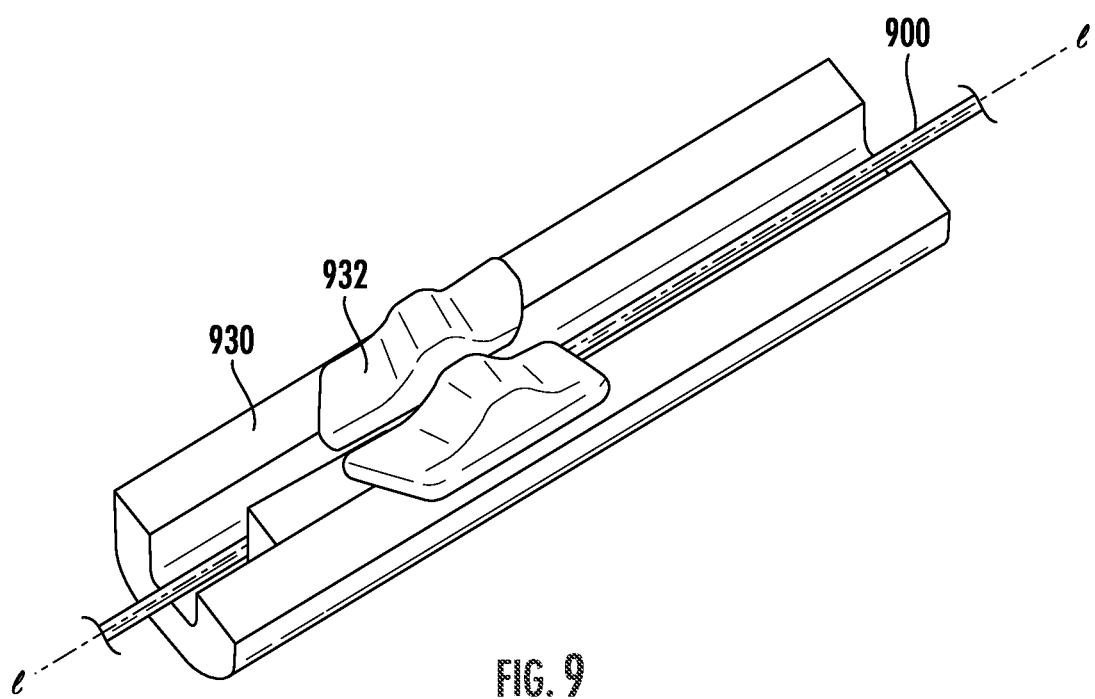

DEVICES, SYSTEMS, AND METHODS FOR ACCESSING A BODY LUMEN

PRIORITY

The present application is a non-provisional of, and claims the benefit of priority under 35 U.S.C. § 119 to, U.S. Provisional Application No. 63/011,386, filed Apr. 17, 2020, the disclosure of which is herein incorporated herein by reference in its entirety.

FIELD

The present disclosure relates generally to the field of medical devices for accessing a body lumen. In particular, the present disclosure relates to medical devices, systems and methods for targeted access to a body lumen opening.

BACKGROUND

Medical professionals sometimes face significant technical challenges when accessing a body lumen, such as when performing endoscopic cannulation procedures that may involve advancing a guidewire and/or endoscopic device (e.g., sphincterotome, cannula, catheter, or the like) against, into, or through tortuous patient anatomies.

For example, a target body lumen, e.g., a biliary sphincter, may be oriented at a difficult angle relative to the endoscopic device, have a very small or sealed opening, include a tortuous anatomy, or have blockages formed, e.g., stones, or benign or malignant strictures. Precise control of movement and translational force of the device and guidewire can be challenging. Even experienced medical professionals may make multiple attempts to achieve successful opening and access to body lumens, especially when working against the friction and patient-specific pathologies of a specific body lumen. The likelihood of causing trauma to tissues comprising or surrounding a target body passageway may increase with the number of opening or entry attempts. In some instances, the medical professional may abort the procedure entirely. In other instances, traumatized tissue may be prone to post-operative inflammation. Even after cannulation, further device manipulation may be required to orient a cutting portion of the device toward a target tissue.

It is with these considerations in mind that the improvements of the present disclosure may be useful.

SUMMARY

Embodiments of the present disclosure may assist generally with accessing and/or enlarging an opening of a body lumen without the need to exchange multiple devices and/or without the need to use devices that do not optimize maneuverability and controlled cannulating and/or cutting. In one aspect, a catheter may include a shaft having a proximal end, a distal end, and a length along a longitudinal axis extending therethrough. A plurality of lumens may extend along at least a portion of the length of the shaft. At least one reinforcing filament may extend along the length of the shaft and between at least two lumens of the plurality of lumens.

In various aspects described herein or otherwise within the scope of the present disclosure, the plurality of lumens may include a first lumen, a second lumen, and a third lumen. The at least one reinforcing filament may extend about at least a portion of a circumference of the first lumen and the second lumen. The at least one reinforcing filament may extend between the third lumen and the first lumen. The at least one reinforcing filament may extend between the third lumen and the second lumen. The plurality of lumens may include a guidewire lumen. The shaft may include a slot that extends from an outer surface of the shaft radially into the guidewire lumen, and the slot may extend along at least a portion of the length of the shaft. The at least one reinforcing filament may be radially separated at the slot. The at least one reinforcing filament may extend between the first lumen and a grouping of the second and the third lumen. The at least one reinforcing filament may extend about at least a portion of a circumference of the grouping of the second lumen and the third lumen. An articulation wire may extend through the second lumen. The shaft may include an articulation portion along a portion of the length of the shaft. The at least one reinforcing filament may not extend about the second lumen. The shaft may include an articulation slot extending from an outer surface of the shaft and radially into the second lumen along the articulation portion of the shaft. The slot may extend along a length of the articulation portion. The at least one reinforcing filament may include a plurality of reinforcing filaments that are braided. The plurality of reinforcing filaments may have a proximal density along the length of the shaft that is less than a distal density of the plurality of reinforcing filaments. The plurality of reinforcing filaments may include a material having a density higher than a density of a material of the shaft. The catheter may include a sphincterotome. The shaft may be over-molded about the at least one reinforcing filament. The at least one reinforcing filament may be coiled about the shaft along the length of the shaft. An outer diameter of the proximal end of the shaft may be larger than an outer diameter of the distal end of the shaft. One or more filaments of the at least one reinforcing filament may wind about at least one of the plurality of lumens at least one full revolution. At least one reinforcing filament may wind about at least one of the plurality of lumens a plurality of times.

In another aspect, a catheter may include a shaft having a proximal end, a distal end, and a length along a longitudinal axis extending therethrough. A plurality of lumens may extend along at least a portion of the length of the shaft. A braided reinforcing tubular member may extend about at least a first lumen of the plurality of lumens and between at least the first lumen and a second lumen of the plurality of the lumens.

In various aspects described herein or otherwise within the scope of the present disclosure, the braided reinforcing tubular member may include a channel within a wall of the braided reinforcing tubular member. The channel may extend along a length of the braided tubular member.

In another aspect, a catheter may include a shaft having a proximal end, a distal end, and a length along a longitudinal axis extending therethrough. A plurality of lumens may extend along at least a portion of the length of the shaft. A braided reinforcing tubular member may extend about and coupled to an outer surface of the shaft.

In various aspects described herein or otherwise within the scope of the present disclosure, the braided reinforcing tubular member may be a single filament. The reinforcing tubular member may be removable by unraveling the filament. The braided reinforcing tubular member may be adhered to the shaft proximal to an articulation portion of the shaft.

BRIEF DESCRIPTION OF THE DRAWINGS

Non-limiting embodiments of the present disclosure are described by way of example with reference to the accompanying figures, which are schematic and not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures:

FIG. 2 illustrates a catheter including a reinforcing member extending about the catheter, according to an embodiment of the present disclosure.

FIG. 3A illustrates a catheter including a braided reinforcing tubular member extending about a lumen, according to an embodiment of the present disclosure.

FIG. 3B illustrates a portion of the catheter of FIG. 3A.

FIG. 9 illustrates a handle reversibly coupled to a catheter, according to an embodiment of the present disclosure.

DETAILED DESCRIPTION

Figure 1:
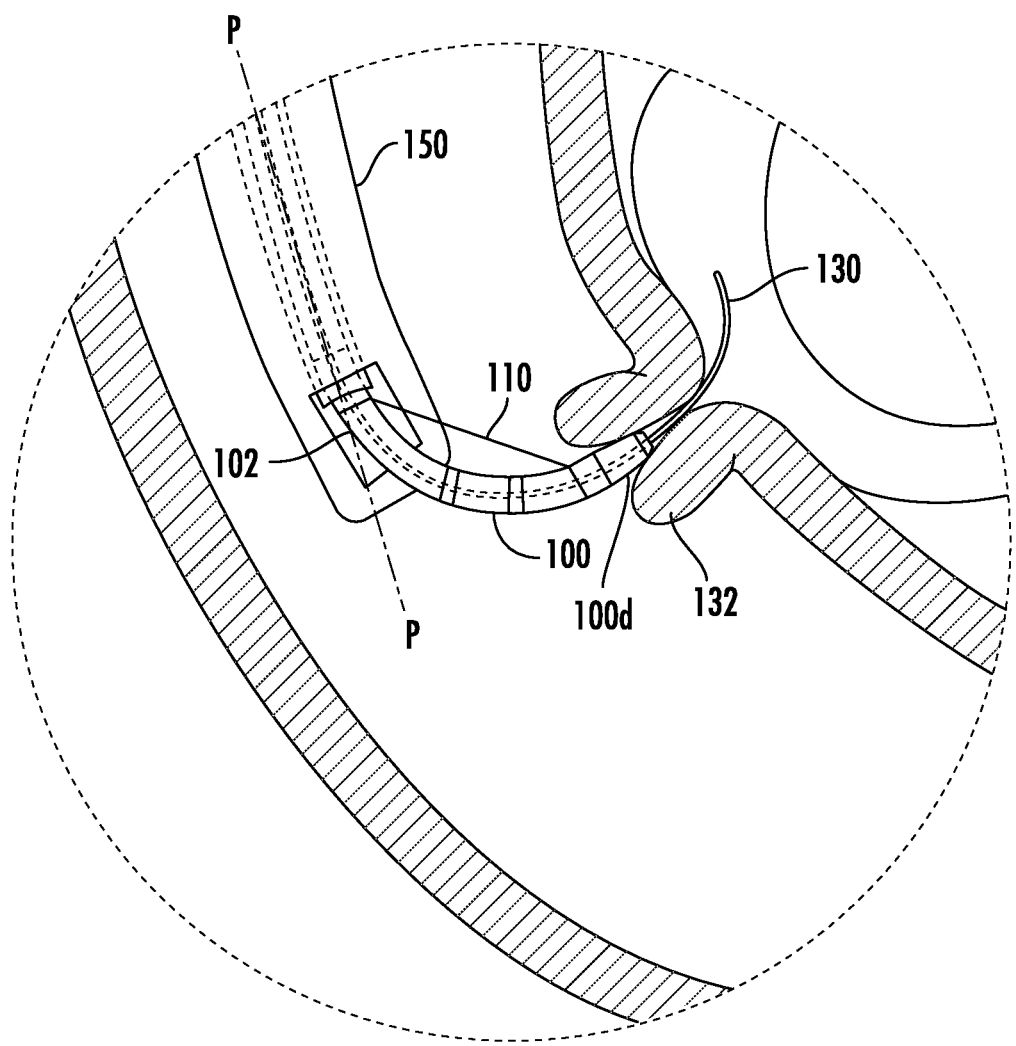
FIG. 1 illustrates a catheter that is a sphincterotome and a guidewire cannulating a body lumen.

The present disclosure is not limited to the particular embodiments described. The terminology used herein is for the purpose of describing particular embodiments only and is not intended to be limiting beyond the scope of the appended claims. Unless otherwise defined, all technical terms used herein have the same meaning as commonly understood by one of ordinary skill in the art to which the disclosure belongs.

Although embodiments of the present disclosure may be described with specific reference to medical devices and systems (e.g., endoscopic devices, accessory tools, and/or guidewires inserted near or through a papilla, or the like) for selective access to, aligning with, cannulation, enlarging, and/or cutting of the opening to the common bile duct (CBD) or pancreatic duct (PD) during endoscopic retrograde cholangiopancreatography (ERCP), it should be appreciated that such medical devices and systems may be used in a variety of medical procedures for navigating one or more devices through ductal, luminal, vascular, or body lumen anatomies, including, for example, interventional radiology procedures, balloon angioplasty/angiography procedures, thrombolysis procedures, urological, or gynecological procedures, and the like. The medical devices herein are also not limited to use with duodenoscopes and may include a variety of medical devices for accessing body passageways, including, for example, catheters, ureteroscopes, broncho-scopes, colonoscopes, arthroscopes, cystoscopes, hysteroscopes, and the like. The disclosed medical devices and systems may also be inserted via different access points and approaches, e.g., percutaneously, endoscopically, laparoscopically, or combinations thereof.

As used herein, the singular forms "a," "an," and "the" are intended to include the plural forms as well, unless the context clearly indicates otherwise. The terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

As used herein, "proximal end" refers to the end of a device that lies closest to the medical professional along the device when introducing the device into a patient, and "distal end" refers to the end of a device or object that lies furthest from the medical professional along the device during implantation, positioning, or delivery.

As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified. The recitation of numerical ranges by endpoints includes all numbers within that range, including the endpoints (e.g., 1 to 5 includes 1, 1.5, 2, 2.75, 3, 3.80, 4, and 5).

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

To help facilitate smooth and efficient entry of a guidewire and an endoscopic device, e.g., a catheter, into/through a target body lumen, medical professionals may manually rotate, oscillate, linearly advance, and/or reciprocate the endoscopic device and guidewire to "wiggle" against, into, or through the body lumen. For example, ERCP may be performed by trained gastroenterologists and surgical endoscopists to diagnose and treat various disorders of the pancreaticobiliary system. Physicians in such procedures may use a sphincterotome to cannulate a body lumen (e.g., the papillary orifice or the like). A sphincterotome may include a guidewire, so that before, during and/or after initial cannulation the guidewire can be inserted into the biliary duct. A sphincterotome may include a cutting wire for enlarging/cutting/accessing tissue to enlarge an opening for access (e.g., a sphincterotomy or the like). A sphincterotome may have a flexible distal end that may be articulated (e.g., bent, steered, bowed, manipulated, or the like) by articulating a wire or wires (e.g., a cutting wire) of the device. The distal end of the sphincterotome may need to access the opening of the body lumen, so that the cutting wire may extend to the tissue of the opening for enlarging or cutting. The target tissue to be treated may be located further within the body lumen, past the point of initial cannulation, so that the device is further steerable through the body lumen to the target tissue. The embodiments of devices that are described or otherwise with the scope of the present disclosure are configured to address one or more the considerations outlined above in order to improve access and navigation.

Referring to FIG. 1, a medical device 100 that is a sphincterotome is inserted into a patient via an endoscope, such as duodenoscope 150. The medical device 100 includes a guidewire 130 extending through a shaft 102 of the medical device 100. The medical device 100 and guidewire 130 are cannulating a body lumen 132. The medical device 100 may have been articulated such that it is oriented toward the body lumen 132 for cannulation by a medical professional proximally translating a wire 110 that is coupled to a distal end 100d of the medical device 100. For example, a distal articulation portion of the medical device 100 may be bent in an arc radially away from an axis P of the proximal portion of the medical device 100. During a procedure, the medical device 100 may need to be rotated about its longitudinal axis, e.g., to orient the wire 110 toward a tissue. However, rotation of a proximal portion of the shaft 102 may not propagate fully to the distal portion of the shaft 102 (e.g., may not result in 1:1 rotation from the proximal end to the distal end of the shaft), which may cause a medical professional to inaccurately position the distal portion of the medical device 100. In some cases, rotation of the proximal portion of the shaft 102 may cause delayed rotation of the distal portion such that the distal portion uncontrollably "whips" about as the proximal rotation builds up and is finally released at the distal portion. Translating rotation along the length of the device 100 may be more difficult when the device is extended through tortious anatomy.

Referring to FIG. 2, an embodiment of a catheter is illustrated including a shaft 200 extending to a distal end 200d. The shaft 200 is being articulated by a wire 208 extending along the shaft 200 similar to the articulation illustrated and described with respect to FIG. 1. A braided reinforcing tubular member 210 extends about the shaft 200 and along a length of the shaft 200. A distal end 210d and a proximal end (not illustrated) of the braided reinforcing tubular member 210 are coupled to the shaft 200. The distal end 210d of the reinforcing member 210 is coupled to the shaft 200 at a location proximal to the wire 208 such that the wire 208 is freely translatable to articulate the shaft 200. The proximal end of the reinforcing member 210 may be coupled to the shaft 200 distal to or at a handle of the device. The reinforcing member 210 comprises a more rigid material and/or a more rigid construction than that of the shaft 200 as is described herein.

In various embodiments, a reinforcing member may have one or more portions, or its entire length, coupled to a shaft. A reinforcing member may comprise a variety of materials, e.g., stainless steel, a polymer, Kevlar, ultra-high-molecular-weight polyethylene, polyether ether ketone, a combination thereof, or the like. A reinforcing member may or may not be electrically insulative, resistant, and/or may or may not include a coating, e.g., polytetrafluoroethylene, high-density polyethylene, or the like, that reduces friction compared to a reinforcing member without the coating. A reinforcing member may be braided. As used herein, "braid" or "braided" may include a component that comprises one or more elements that is/are woven, tied, coiled, wound, looped, helically wound, tubular, laced, crocheted, knitted, a combination thereof, or the like. A portion of a shaft may be etched to provide additional surface area and/or a reduced outer diameter profile for a reinforcing member to bond thereto. An additional material, e.g., an adhesive, a polymer, PEBAX, or the like, may couple a portion of a reinforcing member to a shaft. A reinforcing member about a shaft may increase rigidity (e.g., one or more of torsional, translational, and flexible rigidity or stiffness) of at least a portion of a catheter such that the catheter is more easily manipulated, passed, extended, rotated, or articulated, than without the reinforcing member.

Referring to FIGS. 3A and 3B, an embodiment of a catheter is illustrated including a shaft 300 having a distal end 300d and a length extending along a longitudinal axis l therethrough. The shaft 300 includes multiple lumens 301, 302, 303 extending through the shaft 300 substantially parallel to the longitudinal axis l. The lumens 301, 302, 303 may be configured for multiple uses, e.g., accepting a guidewire, an articulating wire, a cutting wire, a contrast fluid, a combination thereof, or the like. One lumen of the multiple of lumens 301, 302, 303 is shown as a guidewire lumen 301. The guidewire lumen 301 includes a braided reinforcing tubular member 310 extending about the guidewire lumen 301 that is wound about the guidewire lumen 301 multiple times (e.g., at least one revolution or, alternatively, one revolution). The reinforcing member 310 is configured to accept a guidewire and the reinforcing member 310 extends between the guidewire lumen 301 and each of the second and third lumens 302, 303. Although the reinforcing member 310 is illustrated about the guidewire lumen 301, the reinforcing member 310 may extend about the second and/or third lumens 302, 303. The reinforcing member 310 comprises a material and/or a structure having greater rigidity than the shaft 300. The reinforcing member 310 is internal to the guidewire lumen 301. The reinforcing member 310 may be formed within the guidewire lumen 301 of the shaft 300, e.g., by forming and/or extending the reinforcing member 310 over a rod (e.g., a Teflon or other reduced friction rod compared to the reinforcing member 310 and shaft 300), extruding the shaft 300 about the reinforcing member 310 (e.g., over-molded) and removing the rod from the shaft 300 and the reinforcing member 310. In various embodiments, the catheter may be formed by inserting the reinforcing member 310 into a lumen 301, 302, 303 of the shaft 300. In various embodiments, the catheter may be formed by forming the shaft 300 amongst the reinforcing member 310 (e.g., the shaft 300 encapsulating substantially the entirety of the reinforcing member 310) such that the reinforcing member 310 is concentric with, but external to, the lumen 301 (i.e., within the shaft 300 but not within the lumen 301). The reinforcing member 310 includes a channel 312 within a wall of the reinforcing member 310 that extends along a length of the reinforcing member 310. The wall of the reinforcing member 310 at the channel 312 is thinner than a remainder of the wall of the reinforcing member 310. The shaft 300 includes a slot 304 extending from an external surface of the shaft 300 radially into the guidewire lumen 301. The slot 304 is substantially radially aligned with the channel 312 and extends along the length of the channel 312. The channel 312 and slot 304 are configured to allow passage of a guidewire from within the reinforcing member 310 to radially outside of the shaft 300. The shaft 300 may be manipulated in a substantially radial direction (e.g., by a medical professional gripping the shaft 300 and pulling it radially away from the guidewire) such that a guidewire radially traverses through the channel 312 and through the slot 304. For example, a guidewire extending through the guidewire lumen 301 of the shaft 300 and the reinforcing member 310 may be left within a patient and the catheter may be removed from the patient along the guidewire. Thereafter, the catheter may be radially removed from the guidewire by forcing the guidewire through the channel 312 and the slot 304 such that the guidewire remains within the patient and the catheter is no longer extended along the guidewire. Thereafter, another device, e.g., an endoscopic imaging device, catheter, endoscopic instrument, or the like, may be extended over the guidewire without the necessity of removing the guidewire from the patient. This radial removal of the catheter from the guidewire while the guidewire remains within the patient may be referred to as "rapid exchange" herein or otherwise.

In various embodiments, one or both of a slot of a shaft and a channel of a reinforcing member may be perforated, weakened (e.g., treated or thinned compared to a remainder of the shaft or reinforcing member), etched, ground, a combination thereof, or the like. A slot or channel may be pre-formed before forming a catheter, formed during manufacturing of a shaft of a catheter, or may be manufactured after forming a shaft of a catheter.

Figure 4A:
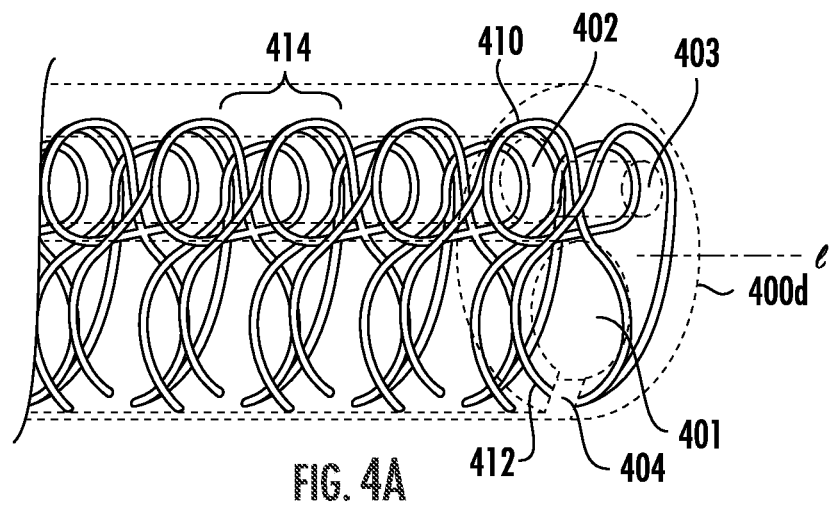
FIG. 4A illustrates a catheter having a reinforcing filament, according to an embodiment of the present disclosure.
Figure 4B:
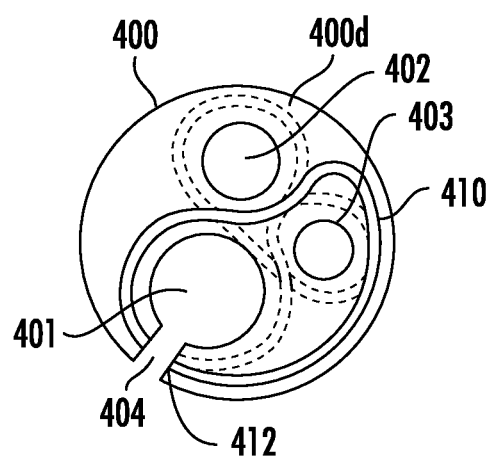
FIG. 4B illustrates a right end view of the catheter of FIG. 4A.

Referring to FIGS. 4A and 4B, an embodiment of a catheter is illustrated including a shaft 400 having a distal end 400d and a length extending along a longitudinal axis l therethrough. The shaft 400 includes multiple lumens 401, 402, 403 extending through the shaft 400 parallel to the longitudinal axis l. The lumens 401, 402, 403 may be configured for multiple uses, e.g., accepting a guidewire, an articulating wire, a cutting wire, a contrast fluid, a combination thereof, or the like. One lumen of the multiple of lumens 401, 402, 403 is shown as a guidewire lumen 401. The shaft 400 includes a reinforcing filament 410 extending along the length of the shaft 400 and also extending about and between each of the lumens 401, 402, 403 (e.g., at least a portion of the circumferences of the lumens 401, 402, 403). In FIG. 4A, the shaft 400 is illustrated in dashed lines and the reinforcing filament 410 is illustrated in solid lines for clarity. In FIG. 4B, a right (i.e., end) view of the shaft 400 is illustrated with the shaft 400 and the reinforcing filament 410 both in solid lines for clarity. The reinforcing filament 410 comprises a material and/or a structure having greater rigidity than the shaft 400. The reinforcing filament 410 may be formed within the shaft 400, e.g., by extending the reinforcing filament 410 over one or more rods (e.g., a Teflon or other reduced friction rod compared to the reinforcing filament 410 and shaft 400), extruding the shaft 400 about the reinforcing filament 410 (e.g., over-molding) and removing the rods from the shaft 400 and the reinforcing member 410. The shaft 400 includes a slot 404 extending from an outer surface of the shaft 400 radially into the guidewire lumen 401. The slot 404 extends along the length of the shaft 400. The reinforcing filament 410 is shown not extending into the slot 404. The reinforcing filament 410 may have a severed or separated portion 412 at or about the perimeter of the slot 404 along the length of the shaft 400 such that the reinforcing filament 410 does not radially occlude the slot 404. Alternatively, the reinforcing filament 410 may be formed along the shaft 400 such that it does not enter the slot 404 (e.g., extending or pathing the reinforcing filament 410 throughout the shaft 400 such that it avoids the slot 404). The slot 404 is configured to allow passage of a guidewire from within the guidewire lumen 401 to move radially outside of the shaft 400 substantially similar to the rapid exchange configuration described with respect to FIGS. 3A and 3B. A gap 414 distance between axially overlapping portions of the reinforcing filament 410 (e.g., windings of the reinforcing filament 410 wound about at least one of the lumens 401, 402, 403 multiple times in a substantially axial direction along the longitudinal axis l) may vary along the length of the shaft 400 such that decreasing the gap 414 may increase the density of the reinforcing filament 410 along the shaft 400, thereby increasing the rigidity of the catheter. Conversely, increasing the gap 414 may decrease the density of the reinforcing filament 410 along the shaft 400 and decrease the density of the reinforcing filament 410 along the shaft 400, thereby increasing the rigidity of the catheter. The pitch of adjacent axially overlapping portions of the reinforcing filament 410 may be adjusted with respect to the longitudinal axis l to vary rigidity of the catheter. For example, a smaller pitch angle may have more windings of the filament 410 along the longitudinal axis l than a higher pitch angle that may have less windings of the filament 410 along the longitudinal axis l. Gap 414 distances and/or pitch angles between adjacent axially overlapping portions of the reinforcing filament 410 may vary along the length of the shaft 400.

Figure 5:
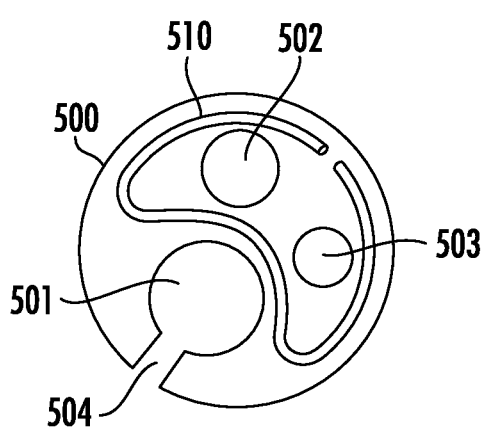
FIG. 5 illustrates a cross-section of a catheter having a reinforcing filament, according to an embodiment of the present disclosure.

Referring to FIG. 5, a cross-section of an embodiment of a catheter is illustrated including a shaft 500 and a reinforcing filament 510. The shaft 500 includes a guidewire lumen 501, a second lumen 502, and a third lumen 503. In this cross-section, the reinforcing filament 510 extends about the second and third lumens 502, 503 and the reinforcing filament 510 is shown not extending about the guidewire lumen 501. The reinforcing filament 510 extends between the guidewire lumen 501 and a grouping of the second and third lumens 502, 503. The reinforcing filament 510 is shown as not radially interfering with the slot 504 with respect to external access to the guidewire lumen 501. In forming the reinforcing filament 510 within the shaft 500, the reinforcing filament 510 does not need to be severed or separated because it does not substantially approach the slot 504.

Figure 6A:
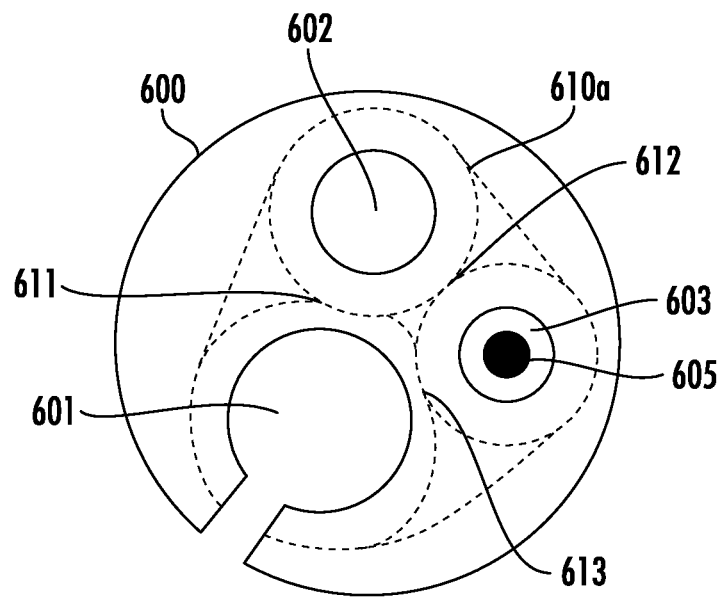
FIG. 6A illustrates a cross-section of a catheter and a marked pathway of the cross-section that may include a reinforcing filament, according to an embodiment of the present disclosure
Figure 6B:
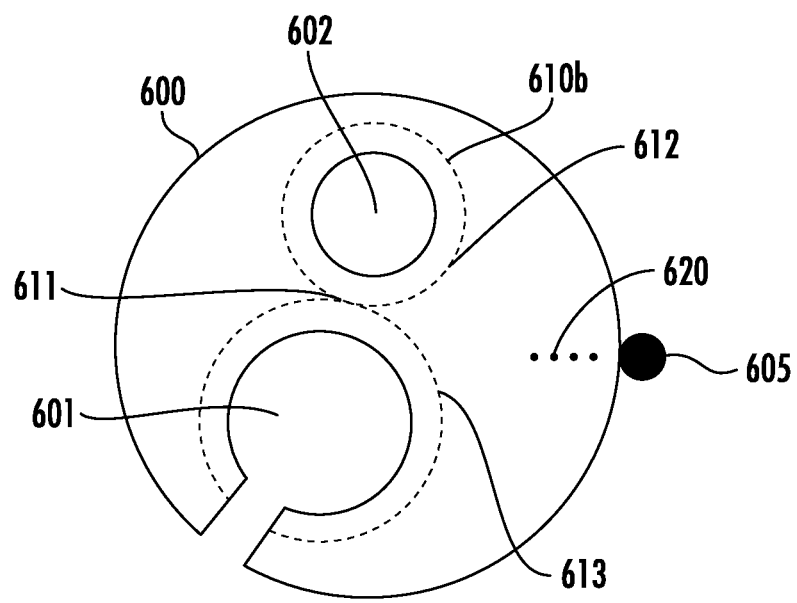
FIG. 6B illustrates a cross-section of the catheter of FIG. 6A at an articulation portion of the catheter.

Referring to FIG. 6A, a cross-section of an embodiment of a catheter is illustrated including a shaft 600 having a guidewire lumen 601, a second lumen 602, and a third lumen 603. The third lumen 603 includes a wire 605. The cross-section includes a marked pathway 610a that may include a reinforcing filament extending along at least portions of the marked pathway 610a. The marked pathway 610a extends about each of the lumens 601, 602, 603. The pathway 610a extends between each of the lumens 601, 602, 603; specifically, the pathway 610a extends through a point of axial axis 611 between the guidewire lumen 601 and the second lumen 602, through a point of axial axis 612 between the second lumen 602 and the third lumen 603, and through a point of axial axis 613 between the third lumen 603 and the guidewire lumen 601. A reinforcing filament may extend along all of or portions of the pathway 610a. A reinforcing filament may extend along different portions of the pathway 610a at various cross-sections along an axial length of the shaft 600. Referring to FIG. 6B, a cross-section of the catheter of FIG. 6A is illustrated at an articulation portion of the catheter, at a different axial location along the length of the shaft 600 of the catheter than that of FIG. 6A. The cross-section of FIG. 6B illustrates the wire 605 external to the shaft 600. The wire 605 is extended radially outside the third lumen 603 (of FIG. 6A) and of the shaft 600 along the axial length of the shaft 600. This cross-section of the catheter of FIG. 6B is at an articulation portion of the catheter where proximal translation of the wire 605 may articulate the shaft 600 and may extend the wire 605 externally away from the shaft 600 (e.g., substantially radially and substantially similar to the configuration of FIG. 1 or 2). The cross-section includes a marked pathway 610b that may include the reinforcing filament extending along at least portions of the marked pathway 610b. The marked pathway 610b extends about each of the guidewire lumen 601 and the second lumen 602. The pathway 610b extends between each of the lumens 601, 602; specifically, the pathway 610b extends through a point of axial axis 611 between the guidewire lumen 601 and the second lumen 602, through a point of axial axis 612 between the second lumen 602 and the wire 605, and through a point of axial axis 613 between the wire 605 and the guidewire lumen 601. A reinforcing filament may extend along all of or portions of the pathway 610b. A reinforcing filament may extend along different portions of the pathway 610b at various cross-sections along the axial length of the shaft 600. The pathway 610b does not extend through radial axis 620. Radial axis 620 is substantially normal to the wire 605 and extends to about the center of an axial axis extending from the third lumen 603 in FIG. 6A through the shaft 600 of both FIGS. 6A and 6B. A reinforcing filament that is shown not extending through the radial axis 620 of an articulation portion of a catheter may increase articulation of the articulation portion of the catheter radially toward the wire 605. In various embodiments, a shaft 600 may include an articulation slot extending from an outer surface of the shaft 600 and radially into and in fluid communication with the third lumen 603. The articulation slot may extend through the radial axis 620. The articulation slot may extend along an axial length of the articulation portion of the shaft 600.

Figure 7:
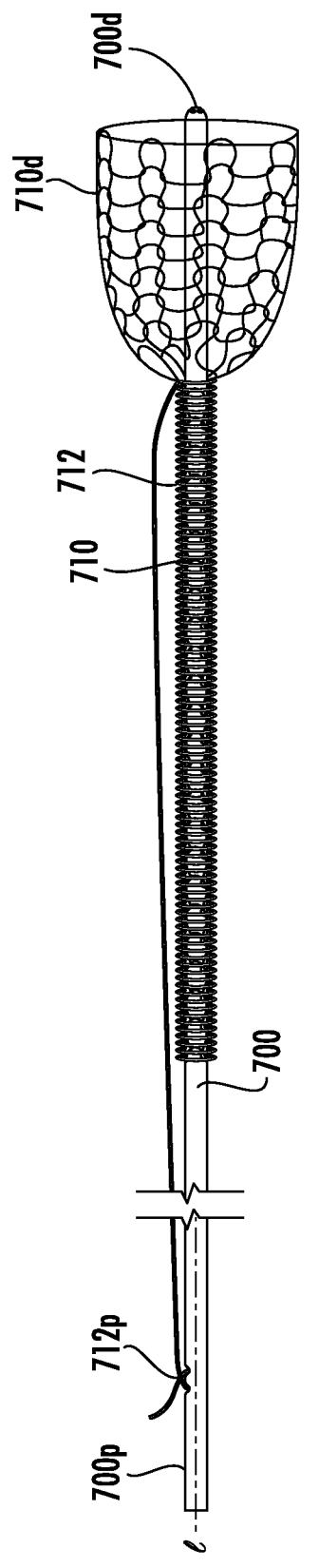
FIG. 7 illustrates a catheter including a braided reinforcing tubular member, according to an embodiment of the present disclosure.

Referring to FIG. 7, an embodiment of a catheter is illustrated including a shaft 700 having a proximal end 700p, a distal end 700d, and a length extending along a longitudinal axis l therethrough. A braided reinforcing tubular member 710 extends about the outer surface of the shaft 700. The reinforcing member 710 has a delivery configuration wherein the reinforcing member 710 is unexpanded about the shaft 700 and is coupled to the shaft by a filament 712 of the reinforcing member 710. In the delivery configuration, the filament 712 is wrapped about the reinforcing member 710. In the delivery configuration, the reinforcing member 710 may increase a rigidity of the distal end 700d of the shaft 700 such that the shaft 700 is more easily manipulated than without the reinforcing member 710. The filament 712 of the reinforcing member 710 may be unraveled from about the reinforcing member 710, e.g., by proximally translating a proximal end 712p of the filament 712. The filament 712 may be unraveled from the reinforcing member 710 such that as the filament 712 is unraveled, a distal portion 710d of the reinforcing member 710 is decoupled from the shaft 700 in a removal configuration. In FIG. 7, the distal portion 710d is in the removal configuration while the remainder of the reinforcing member 710 is in the delivery configuration coupled to the shaft 700 by the filament 712. The distal portion 710d in the removal configuration will proximally extend along the length of the shaft 700 as the filament 712 is proximally translated and unraveled from about the reinforcing member 710. The reinforcing member 710 may be delivered along with the shaft 700 to a treatment area in the delivery configuration with the reinforcing member 710 coupled to the shaft 700 by the filament 712. Thereafter the reinforcing member 710 may be removed from the shaft 700 by proximally translating the filament 712 to transition the reinforcing member 710 to the removal configuration. The reinforcing member 710 may be removed from the patient by proximally translating the filament 712 coupled to the reinforcing member 710 until the reinforcing member 710 is proximally translated and removed. The proximal end 712p of the filament 712 may be reversibly coupled to the shaft 700 in the delivery configuration and may be decoupled and removed from the shaft 700 in the removal configuration. The proximal portion 712p may be coupled to the shaft 700 by looping the proximal portion 712p through one or more apertures in the shaft 700. Alternatively, the proximal portion 712p may be adhered to the shaft 700. In various embodiments, the filament 712 may make up the reinforcing member 710, e.g., such that interwoven construction of the filament 712 may be unraveled by proximally translating the filament 712.

Figure 8:
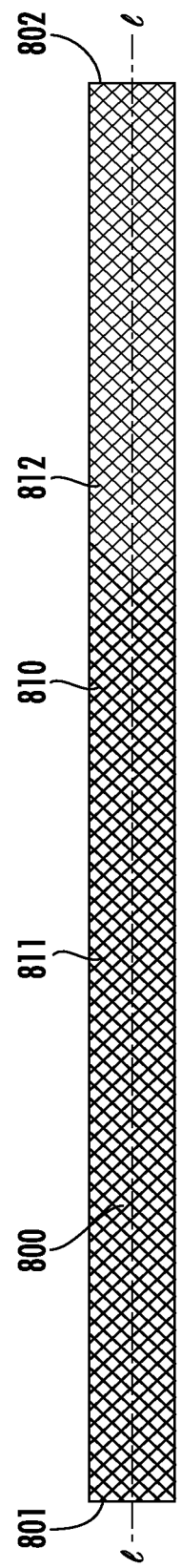
FIG. 8 illustrates a catheter including a reinforcing member having a variable density extending about the catheter, according to an embodiment of the present disclosure.

FIG. 8 illustrates an embodiment of a catheter including a shaft 800 having a first end 801, a second end 802, and a length extending along a longitudinal axis l therethrough. A braided reinforcing tubular member 810 extends about the shaft 800 and along the length of the shaft 800. The reinforcing member 810 comprises one or more rigid materials and/or a more rigid construction than that of the shaft 800 as is described herein. The reinforcing member 810 has a variable density along its length. A first portion 811 of the reinforcing member 810 comprises a first material that transitions along the longitudinal axis l to a second portion comprising a second material. The first and second portions 811, 812 have differing densities. A denser portion of the reinforcing member 810 may translate rotation to the shaft 800 and may translate the shaft 800 through anatomies more easily than a less dense portion of the reinforcing member 810. A less dense portion of the reinforcing member 810 may be more flexible and articulable than a denser portion of the reinforcing member 810. One or more portions 811, 812 of the reinforcing member 810 may include a coating configured to affect a density of the reinforcing member 810. The reinforcing member 810 may comprise one or more materials as described herein.

Referring to FIG. 9, an embodiment of a catheter is illustrated including a shaft 900 having a longitudinal axis l that is extending through a handle 930. The handle 930 may be translated along a length of the shaft 900. The handle 930 includes a slider 932 that may be manipulated by a hand of a user (e.g., a thumb of the user) to move the slider 932 with respect to the handle 930 substantially parallel with the longitudinal axis l. The slider 932 reversibly couples and decouples the shaft 900 temporarily to and from the handle 930 by compressing and decompressing the shaft 900 substantially radially against the handle 930. The handle 930 may be coupled to the shaft 900 at various locations along the length of the shaft 900 and may be used to manipulate the shaft 900 at a desirable location along the shaft 900. For example, a distal end of the shaft 900 may be easier to manipulate with the handle 930 located along the axis l distally closer to the distal end of the shaft 900 rather than at a more proximal location along the axis l.

In various embodiments, a distal portion and/or a distal end of a shaft may be articulated via proximal or distal translation of one or more wires. A proximal translation of a wire may pull the distal end of a shaft such that the distal portion of the shaft bends toward the translated wire. A medical professional may translate one or more wires via a handle at the proximal end of the shaft containing a pulley assembly connected to a wire that is actuatable to translate the wire within the wire lumen. In various embodiments, a lumen of the shaft may be configured to receive a guidewire such that a distal portion of the guidewire may extend distally beyond the distal end of the shaft. The shaft may include a distal portion configured to move with the translation of a wire (e.g., flex, bend, rotate, wobble, spin, etc.) in a plurality of directions (e.g., x, y, and/or z directions), thereby imparting an identical or similar direction of movement to the distal portion of the guidewire and/or the distal end of the shaft.

In various embodiments described herein, a particular number of reinforcing filaments having a particular number of windings are illustrated, however, any number of reinforcing filaments may be used having any number of windings, e.g., 0, 2, 3, 4, 5, 6, 8, 10, 15, 20, 50, 100, 1000, or the like of a number of filaments or a number of windings of one or more filaments.

In various embodiments, a reinforcing member may increase rigidity of a shaft compared to a tube without a reinforcing member. A rotation of a proximal portion of a shaft about its longitudinal axis while including a reinforcing member may better translate the rotation to a distal portion of the shaft compared to a shaft without a reinforcing member. A reinforcing member may comprise a material that is more rigid than the shaft. For example, a reinforcing member may comprise a metal such as stainless steel, titanium, nickel alloy, cobalt chrome, or nickel titanium alloy, a higher durometer polymer than a shaft such as Kevlar, high-density polyethylene, ultra-high-molecular-weight polyethylene, a combination thereof, or the like. Examples of materials which may be used for a shaft may include polyether ether ketone, polytetrafluoroethylene, fluorinated ethylene propylene, a combination thereof, or the like. A reinforcing member may have a geometric structure, thickness, density, number of subassemblies (e.g., filaments), number of windings, pitched windings, or the like that increases its torsional stiffness and decreases its bending stiffness.

In various embodiments, a cutting wire may be conductive and coupled to a power source in order to deliver energy to the wire. The wire may be insulated along at least a portion of a length of the wire and/or the wire may be non-insulated along at least a portion of the length of the wire.

In various embodiments, described here or otherwise within the scope of the present disclosure, a sphincterotomy procedure may be performed by steering an embodiment of a catheter such that the distal end of the catheter is against an opening of a body lumen (such as an ampulla). The distal end may be advanced through the body lumen and steered through the lumen and/or toward a desired duct. A guidewire may be advanced through a central lumen of the catheter. The location and position of portions of the catheter and/or the guidewire may be observed, e.g., via fluoroscopy. Further steering of the catheter and/or the guidewire may be performed to achieve cannulation by articulating a distal end of the catheter into the body lumen. A medical professional may articulate a distal end of the catheter, e.g., in a position similar to that of FIG. 1 to manipulate and/or cannulate an opening of a body lumen. A medical professional may energize a wire in contact with tissue of the body lumen to assist with opening of the body lumen. The catheter may be removed from the patient, leaving the guidewire in the body lumen to guide another catheter to be used in the procedure, or the same catheter used to perform the sphincterotomy may continue to be used for the procedure.

In various embodiments, a method of directing a catheter toward an opening of a body lumen of a patient may include inserting the catheter into the patient. A wire of the catheter coupled to a distal end of the catheter may be translated proximally such that the distal end of the catheter is directed toward the opening of the body lumen. The body lumen may be cannulated. Proximally translating the wire may include contacting the body lumen with the wire and energizing the wire. A contrast fluid may be supplied through a lumen of the catheter. The catheter may be visualized within the body lumen.

In various embodiments, a shaft of a catheter may comprise an extrusion of multiple lumens. The lumens may be extended through a proximal end of the tube to the distal end of the tube, and a portion of the lumen(s) may be exposed to an external surface of the tube. One or more lumens (e.g., a wire lumen) may terminate at a point that is proximal to the distal end of the tube. The lumens may be configured to accept instruments and/or fluids (e.g., a contrast agent, a wire, a guidewire) of the catheter through at least a portion of the lumen and may extend out of a lumen where the lumen is exposed to the outer surface of a tube. Such instruments may extend partially along a lumen and may extend external to the lumen along various portions of the lumen exposed to an outer surface of the elongate tube. Such instruments or portions of an instrument extending external to a lumen may break through a wall of the lumen (e.g., through perforations, thin walls, apertures, or the like) and/or tube such that the instrument is external to the lumen at the outer surface of the tube. One or more ends of the tube may be drawn down to a thinner outer diameter (compared to the remainder of the tube) such that some or all of the lumens decrease in inner diameter and taper distally to a closed distal end and/or the tube is treated at the tip such that some of or all of the wire lumens are closed at an end. A drawn-down distal or proximal end may have a smaller diameter than a diameter of other portions of the tube. A portion of a lumen may be a C-shaped channel extending along a portion of the shaft, e.g., where a portion of a wire may extend outside of the tube. The channel may comprise other shapes such as, e.g., U-shaped, V-shaped, triangular, boxed, or a combination of these shapes, etc. A channel, such as these channels, may be an open channel or a closed channel. A closed channel may have one or more portions of varying wall thickness, e.g., a thinner wall at a portion of the channel.

In various embodiments, lumens within a shaft may be arranged in different configurations and combinations depending on the instrument and requirements for a particular application. For example, a lumen configured for a guidewire may also be configured (or instead be configured) for delivery of a contrast agent, etc. Embodiments described and illustrated herein are not meant to exclusively include only those lumens, and do not necessarily need to include all of the lumens illustrated.

In various embodiments, fluoroscopy may assist in positioning a system or medical device according to the present disclosure, or for confirming the location of lumens, wires, tissues, presence of one or more bodies such as gallstones, etc. A contrast agent may be injected through a central lumen of a catheter and into or about the body lumen for performing fluoroscopy. A guidewire may be withdrawn from the lumen to allow the contrast agent to be injected through the same lumen. Alternatively, a contrast agent may be injected in the lumen containing the guidewire such that the contrast agent flows through the lumen about the guidewire. Alternatively, a lumen or a portion of a multi-lumen shaft (e.g., a bifurcated lumen) may be dedicated to the flow of a contrast agent from the catheter. Alternatively, a lumen may be used for a first purpose and later be used for a second purpose, e.g., first to receive a guidewire and second to flow a contrast agent. The contrast agent may comprise iodine, barium sulfate, gadolinium, or the like, or some combination thereof.

All of the devices and/or methods disclosed and claimed herein can be made and executed without undue experimentation in light of the present disclosure. While the devices and methods of this disclosure have been described in terms of preferred embodiments, it may be apparent to those of skill in the art that variations can be applied to the devices and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A catheter comprising:
   a shaft having a proximal end, a distal end, and a length along a longitudinal axis extending therethrough;
   a plurality of lumens extending along at least a portion of the length of the shaft; and
   a braided reinforcing tubular member extending within and around the interior of at least a first lumen of the plurality of lumens;
   wherein a channel is defined by the wall of the braided reinforcing tubular member further and extends along a length of the braided tubular member.

2. The catheter of claim 1, wherein the channel is an open channel defined in the exterior of the braided reinforcing tubular member, and the shaft further comprises a slot extending longitudinally along the shaft from an external surface of the shaft radially inwardly and aligned with the open channel defined in the exterior of the wall of the braided tubular member.

3. The catheter of claim 1, wherein the open channel is configured to allow passage of a guidewire therethrough from within the shaft to radially outside the shaft.

4. A catheter comprising:
   a shaft having a proximal end, a distal end including a distal articulation portion, and a length along a longitudinal axis extending therethrough;
   an articulating wire extending along the outside of the shaft from a proximal end of the distal articulation portion to the distal end of the distal articulation portion and spaced apart from the shaft between the proximal end of the distal articulation portion and the distal end of the distal articulation portion; and
   a braided reinforcing tubular member extending about and coupled to the shaft proximal to the proximal end of the distal articulation portion of the shaft
   wherein the braided reinforcing tubular member is a single filament, and wherein the braided reinforcing tubular member is removable by unraveling the filament.

5. The catheter of claim 4, wherein the braided reinforcing tubular member increases rigidity of the shaft when in a delivery configuration and is unraveled by proximally translating a proximal end of the single filament.

6. The catheter of claim 4, wherein the braided reinforcing tubular member is adhered to the shaft proximal to an articulation portion of the shaft.

* * * * *